US006598284B1

(12) United States Patent
Chiari et al.

(10) Patent No.: US 6,598,284 B1
(45) Date of Patent: Jul. 29, 2003

(54) METHOD OF PREPARING A SYSTEM OF CONVERTING TOOLS AND PRESETTING TABLE FOR WORKING THE METHOD AS WELL AS AN ASSEMBLY OF COMPONENTS FOR PREPARING AN UPPER STRIPPING DIE

(75) Inventors: Mauro Chiari, Denges (CH); Sylvain Rebet, La Croix-sur-Lutry (CH)

(73) Assignee: Bobst S.A. (CH)

( * ) Notice: Subject to any disclaimer, the term of this patent is extended or adjusted under 35 U.S.C. 154(b) by 130 days.

(21) Appl. No.: 09/677,230

(22) Filed: Oct. 2, 2000

(30) Foreign Application Priority Data

Oct. 26, 1999 (CH) ............................................. 1949/99

(51) Int. Cl.[7] ................................................ B23Q 3/00
(52) U.S. Cl. ............................ 29/468; 29/464; 29/466; 493/343; 493/472
(58) Field of Search .......................... 29/465, 466, 468, 29/469, 464; 493/342, 343, 82, 83, 373, 472

(56) References Cited

U.S. PATENT DOCUMENTS 3,249,272 A * 5/1966 Scarpa .......................... 225/1
4,015,495 A * 4/1977 Yerly .......................... 83/103
4,175,686 A * 11/1979 Lang .......................... 225/97
4,371,369 A * 2/1983 Wright, III ................. 493/373
4,452,595 A * 6/1984 Huff ............................ 493/83
5,179,882 A * 1/1993 Takeuchi et al. .............. 83/125
5,192,011 A * 3/1993 Fuchs .......................... 225/97
5,341,558 A 8/1994 Varidel et al. ................... 19/2
5,353,978 A 10/1994 Varidel et al. ...................... 3/2
5,474,219 A * 12/1995 Mano ............................ 225/2
5,605,527 A * 2/1997 Gillieron .................... 493/342
5,735,442 A * 4/1998 Emrich .......................... 225/1
5,810,233 A * 9/1998 Varidel ........................ 225/97
5,881,620 A * 3/1999 Smithwick et al. ........... 83/116
5,893,825 A * 4/1999 Rebeaud ..................... 493/468
6,325,263 B1 * 12/2001 De Dompierre et al. ...... 225/97

FOREIGN PATENT DOCUMENTS

CH 682651 10/1994 .................... 43/18

* cited by examiner

*Primary Examiner*—Gregory Vidovich
*Assistant Examiner*—Essama Omgba
(74) *Attorney, Agent, or Firm*—Ostrolenk, Faber, Gerb & Soffen, LLP

(57) ABSTRACT

A presetting table for preparing a system of converting tools in a stripping station of a converting press positions the following face to face, in a position simulating centring along the machine axis and positioning at the first rule: the stripper-holder plate of an upper stripping die, a central stripping board and a replica of a pull-out frame carrying telescopic pins. The upper stripping die is prepared by using the central stripping board as a template.

5 Claims, 2 Drawing Sheets

METHOD OF PREPARING A SYSTEM OF CONVERTING TOOLS AND PRESETTING TABLE FOR WORKING THE METHOD AS WELL AS AN ASSEMBLY OF COMPONENTS FOR PREPARING AN UPPER STRIPPING DIE

BACKGROUND OF THE INVENTION

The invention relates to a method of preparing a system of converting tools in a stripping station in a converting press, the converting-tool system comprising at least one central stripping board and an upper stripping die with a stripper-holder plate.

The invention also relates to a presetting table for working the method. The invention also relates to an assembly of components comprising a stripper-holder plate and a set of strippers for preparing an upper stripping die.

Presses for converting compact cardboard or corrugated cardboard sheets for production of packagings usually comprise a number of sucessive stations in the press, through which the sheets travel in succession. Starting from an infeed device or feeder, the sheets travel at a timed rate through a diecutting station where each sheet is cut into one or more blanks which remain interconnected by connections and entrain waste pieces of sheet situated around and between them, a stripping station where the cutting waste is removed, and a blank separating station where the connections are broken, after which the blanks are stacked.

In the stripping station the cut sheet is placed on to a wooden board with apertures, i.e. the central stripping board, formed with a plurality of pre-cut apertures. The apertures are disposed opposite the waste pieces of sheet and have an overall shape corresponding thereto, with a somewhat larger outline. The stripping operation is performed by using at least one movable upper stripping tool which descends perpendicularly to the cardboard sheet and pushes the waste through the apertures in the central stripping board.

The upper stripping tool is frequently an upper stripping die comprising a wooden board on to which strippers are fixed by screwing, nailing or sticking at places corresponding to the waste to be stripped, the strippers having varying forms adapted to the shape of the waste, such as nails, pins, strips or blocks of wood. Preparation of such a stripping die requires lengthy, meticulous work by a die-maker, and a stripping die can be used for only a single cutting pattern. If the manufacturer needs to perform a large number of different recurring jobs, in small or medium series, a corresponding number of different stripping dies, each costing several hundred Swiss francs to make will have to be constructed and stored.

To obviate this disadvantage, Swiss patent application CH 1417/99 by the Applicant describes a universal stripping tool comprising a stripper-holder plate comprising a pair of identical metal sheets formed with a large number of perforations over their entire surface and mounted on a tubular frame. The strippers are chosen from among rectangular blocks comprising magnetic fixing studs and stripping pins in the form of a rod bent twice at right angles to form a U having two arms of unequal length inserted simultaneously into two pairs of perforations in the two perforated metal sheets and remaining held there by the relative elasticity of the two arms.

Patent CH-682651 describes a movable upper tool in a blank separating station, comprising punches carried by a board formed with openings through which air flows. The lower surface of the board is covered with a layer of "velcro" or similar hook-fibers. The upper surface of each separating punch is covered with a second layer of "velcro" or similar mating hook fibers adapted to engage the layer of fibers covering the board and securing the punch to the board. The punches are arranged in a manner corresponding to the positions of the connections between the blanks in a sheet. This tool is modified for each job and avoids the need to store a large number of blank separating tools, each corresponding to a given job.

Automatic converting presses are capable of processing several thousand sheets per hour. Short series of blanks for packagings themselves comprise only a few thousand articles. It is therefore essential for economic reasons to be able to change from one job to another, i.e. to prepare the converting tools and insert the tools in the machine, adjust them to size and secure them, without stopping the machine for more than a few minutes.

The actual operation for fixing the strippers and punches mentioned hereinbefore to their supports is brief but very tricky, since an error in positioning may result in jamming the machine. Preparation therefore requires laborious corrections.

SUMMARY OF THE INVENTION

One aim of the invention is to propose means for rapidly preparing the converting tools, more particularly the converting tools in the stripping station, during masked time, i.e. while the machine is carrying out a different job, by drawing from a limited stock of standardised components. Another object of the invention is to prepare the tools in such a way that they can be positioned in the station without requiring laborious adjustments. Finally, preparation should be as accurate as the work of a die-maker.

The invention therefore proposes a method of preparing a system of converting tools in a stripping station of a converting press comprising at least one central stripping board and an upper stripping die with a stripper-holder plate, comprising the following steps:

- the central stripping board and the stripper-holder plate are disposed face to face outside the converting press and fixed in an adjustment position,
- the strippers are fixed to the stripper-holder plate in line with the apertures in the central stripping board in order to form the upper stripping die,
- the upper stripping die and the central stripping board are placed and centered in the stripping station.

The method can be worked according to the invention by means of a presetting table comprising a frame, bearing support means and means for fixing the stripper-holder plate, means for supporting the central stripping board in order to hold a central stripping board in contact with or near a stripper-holder plate, and means for fixing the central stripping board, chosen so as to fix a central stripping board in the adjustment position.

In the method according to the invention, the central stripping board serves as a template for rapidly and accurately positioning the strippers on the stripper-holder plate.

The presetting table according to the invention can be used to effect this operation in reliable manner without worrying about the respective positions of the stripping board and the stripper-holder plate once fixed to the table, since the table holds them in the correct adjustment position without risk of accidental displacement while the operator is fixing the strippers on the plate.

The user in principle need store only two stripper-holder plates, one in operation in the machine at work whereas the other is prepared outside the machine for the next job. A small number of plates is sufficient in every case.

Preferably, the strippers and the stripper-holder plate are designed so that the strippers can be placed and fixed to the plate manually and removably, so that their arrangement can be altered when required.

Preferably, in the adjustment position, the stripper-holder plate and the central stripping board are in the same relative positions, seen in projection on to a plane parallel to the central stripping board, as the positions which they occupy when placed in the stripping station, when they are centered laterally with respect to the machine axis and adjusted longitudinally to the first rule. If this adjustment position in the presetting table is adopted, there will be no need for an additional adjustment operation when the tools are inserted into the stripping station.

Terms such as "longitudinal", "lateral", "front" and "rear" are used here with reference to the direction of advance of the sheets in the machine. The machine axis is a virtual axis in the direction of advance, used as a reference for all adjustments of components of the converting press in the transverse direction.

The term "first rule" refers to the first transverse rule of the shape for cutting in the diecutting station.

In present-day converting presses, the converting tools usually comprise reference and locking means such as stops and studs, corresponding to mating reference and locking means on the machine, so that the tools can be quickly and reproducibly centered when positioned, laterally with respect to the "machine axis" and longitudinally with respect to the longitudinal stop positions of the sheet-driving system and to the longitudinal positions of the other tools with which they co-operate, particularly the first rule. In working the invention, the position of a stripping die and/or a stripping board outside the machine can be determined via the front edge of the plate or board respectively and by means of a centering stop co-operating respectively in the machine with a support surface and a slot or notch in a stud on a stand or frame of the station where the tool is used.

In order to place the stripper-holder plate and the central stripping board in the adjustment position mentioned hereinbefore, the presetting table comprises two parallel support bars for the front edges of the stripper-holder plate and of the central stripping board, offset from one another if required so as to reproduce the longitudinal adjustment of the machine to the first rule. The presetting table can comprise two fixed adjustement studs each having a notch, slot or slideway adapted to receive the stops for centering on the respective machine axis of the central stripping board and of the stripper-holder plate, the two notches/slots/slideways being centered relative to the same plane perpendicular to the plane of the central stripping board and perpendicular to the support plane of a support bar.

Preferably, the support bars of the presetting table are contiguous, so that the stripper-holder plate and the central stripping board are in contact with one another in the adjustment position. This makes it easier to position the strippers accurately.

In order to hold the stripper-holder plate in position in the presetting table, the table can comprise a latch, disposed on its stand so as to come into engagement with the rear edge of the stripper-holder plate. To allow for different possible dimensions of the stripper-holder plate, the latch can be mounted on a movable carriage sliding on the stand in the direction of the table which corresponds to the machine axis.

In order to hold the central stripping board against the stripper-holder plate, the presetting table may also comprise an arm pivoting in a plane parallel to the plane of the board and having a pivot axis disposed above the support bar and at a distance therefrom greater than the maximum longitudinal size of the board and the plate. At its free end, the support arm can carry a presser finger provided with a spring return system exerting a pressure which holds the stripping board against the stripper-holder plate.

The system of converting tools in a stripping station can also comprise a lower stripping gripper tool comprising a plurality of gripper tools such as telescopic pins and one or more gripper tool-holders. Gripper tool-holders of this kind comprise e.g. adjustable bars disposed and fixed in a pull-out frame in the stripping station, carrying means for fixing in longitudinally and laterally pre-indexed positions.

Advantageously, the method according to the invention includes a step of adjusting the lower stripping tool wherein the gripper tool-holder or holders are brought into an adjustment position in line with the central stripping board which itself is fixed in the adjustment position facing the upper stripping die formed. This adjustment position of the gripper tool-holder or holders, seen in projection on to a plane parallel to the stripping board, is the same as the position occupied in the stripping station relative to the central stripping board. When the gripper tools are telescopic pins, they are positioned so that the free points of the pins are adjusted in contact with the strippers.

Preferably, the support for the gripper tool-holder or holders of the presetting tables is movable and adapted to be moved between the position for adjusting the gripper tools and a moved-aside position giving an operator access to the central stripping board in order more easily to position or adjust the positions of the various tool-holders and tools.

When the converting press is equipped for receiving the telescopic pins carried by the adjustable bars, which in turn are carried by a pull-out frame of the stripping station comprising a plurality of bar-fixing means in an indexed arrangement, the presetting table comprises a frame pivoting on a pivot axis situated on the stand of the presetting table and comprising the same plurality of bar-fixing means in the same indexed arrangement, so that the geometrical characteristics of the pull-out frame of the stripping station are reproduced in the presetting table.

BRIEF DESCRIPTION OF THE DRAWINGS

Other features of the method and device according to the invention will be clear to the skilled man from the following description of an embodiment of the presetting table with reference to the drawings, in which.

DETAILED DESCRIPTION OF EMBODIMENTS OF THE INVENTION

Figure 1:
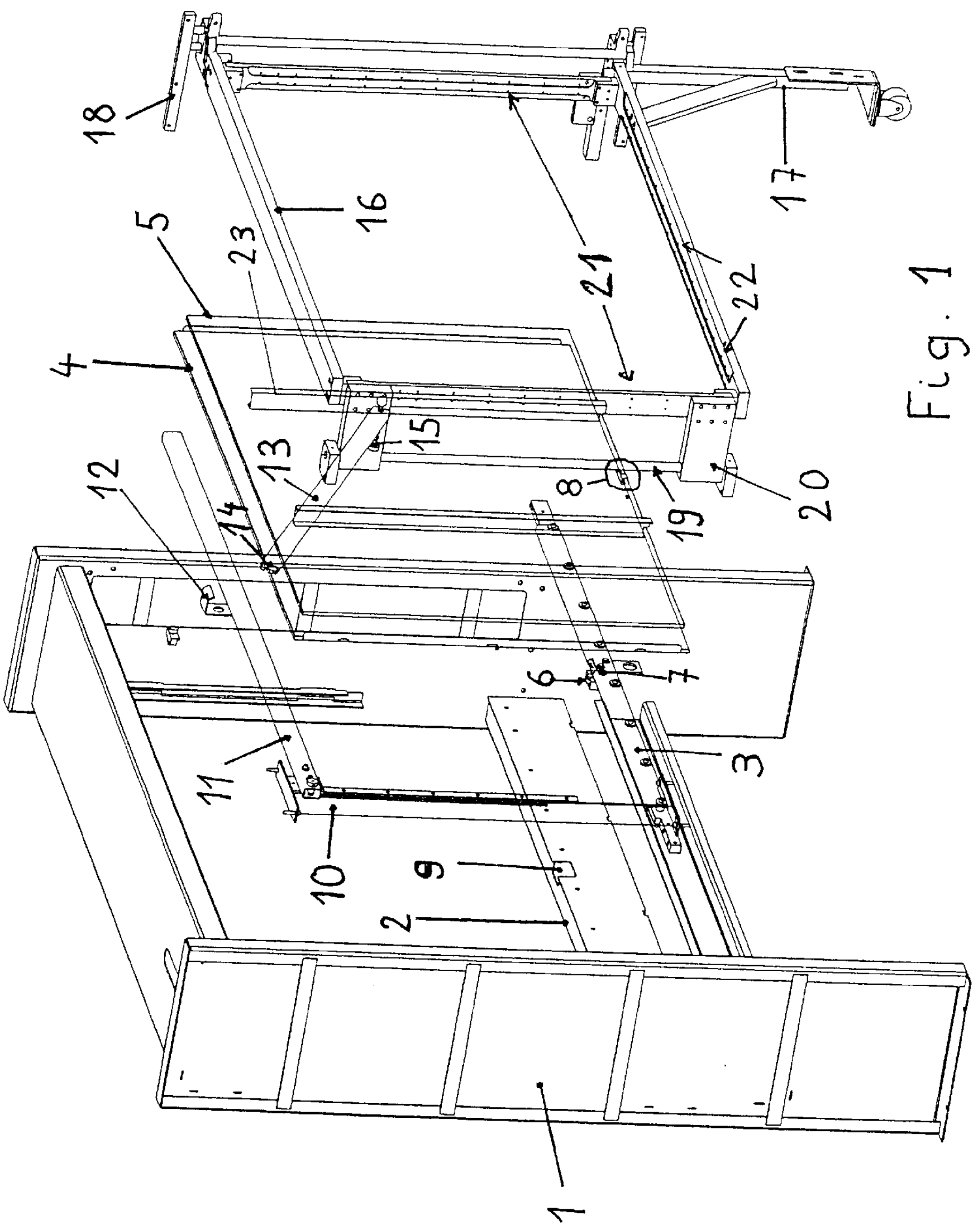
FIG. 1 is an exploded perspective view of this embodiment.

FIG. 1 shows a presetting table comprising a stand 1 consisting of a supporting gantry. A horizontal support bar 2 is fixed in the gantry and on it rests the front edge of a stripper-holder plate 4 in the vertical position at a height such that the entire surface of the stripper-holder plate 4 is within reach of an operator.

A horizontal support bar 3 for supporting the central stripping board 5 is bolted to the support bar 2. Depending on the type of machine or the type of tool, the support bar 3 can be fastened at the same height as the support bar 2 or shifted by a few millimeters to a few tens of millimeters vertically, corresponding exactly to the shift of the front edges of the stripper-holder plate and the central stripping board in the stripping station where they are adjusted to the first rule.

The support bar 3 bears two studs 6 and 7, each with a notch having a size exactly adapted to receive, respectively, the stop (not shown in FIG. 1) for centering the tool-holder plate and the stop 8 of the central stripping board. The notches in the studs 6 and 7 are aligned in a plane perpendicular to the support bar 3. The stud 6 can engage in a corresponding recess 9 on the support bar 2.

An inner gantry, only one upright 10 of which is shown in FIG. 1, is mounted on the support bar 2. It comprises a system of rails, cables, pulleys and counterweights, known per se, for sliding a carriage 11 in the vertical direction. The carriage 11 has a central latch 12 which engages the rear edge of the upper stripping die 4. The vertically sliding carriage 11 can grip and hold upper stripping dies having variable longitudinal dimensions. The maximum distance of the latch relative to the support bar 2 is greater than the length of the maximum size of sheet acceptable by the converting press. The length of the support bars 2 and 3 is greater than the width of the maximum size of sheet acceptable by the converting press.

The stand 1 bears a pivoting arm 13 which pivots in a vertical plane parallel to the support bar 3, i.e. to the central stripping board 5. The pivot axis 14 of the arm 13 is situated at a height, relative to the support bars 2 and 3, which is greater than the largest size of upper stripping tool and stripping board. The free end of the arm 13 has a presser finger 15. A spring mounted between the arm 13 and the telescopic support head of the presser finger 15 tends to exert a compressive force against the central stripping board 5 and hold it pressed against the stripper-holder plate 4.

On one side, the stand 1 holds a vertical rotating shaft 19 on which a frame 16 is mounted via spacers 20. Owing to its weight, the frame 16 on the other side of the stand 1 is mounted on a foot 17 which itself is mounted on casters. On the same side as the foot 17, the frame 16 has spacer rods 18.

The frame 16 is a replica of the pull-out frame in the stripping station, which is adapted to carry the lower stripping pins, via adjustable tool-holder bars. The frame 16 bears the same adjustable-bar fixing means 21, 22 in the same arrangement and with the same indexing, using numbers, as the pull-out frame. Consequently an adjustable bar or an assembly of adjustable bars secured by a crossbar and forming a sub-frame can be transported from the pull-out frame of the stripping station to the presetting table or vice-versa, without repositioning errors.

When the frame 16 pivots in the direction of the support bars 2 and 3, the spacer rods 18 come against a corresponding part of the stand 1. The assembly formed by the spacers 20 and the spacer rods 18 is adjusted so that in the said abutting position, the frame 16 is parallel to the support bars 2, 3 and is at a distance such that when the stripping board 5 and an adjustable bar are positioned in the presetting table, they are at a distance from one another equal to the distance between them in the stripping station when the pull-out frame is in the high position, plus a length slightly greater than the thickness of the board.

The method according to the invention will now be described with reference to three examples of preparation of stripping tools.

EXAMPLE 1

Preparation of an Upper Stripping Die

Figure 2:
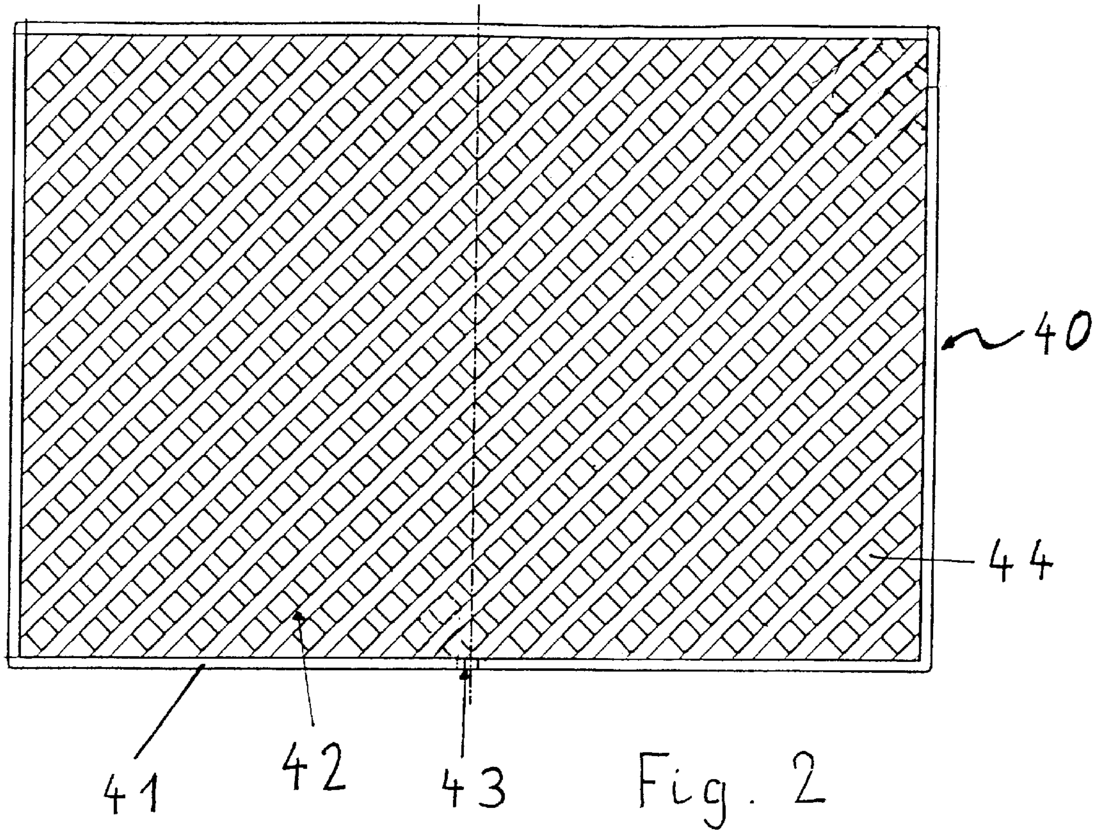
FIG. 2 is a diagrammatic front view of a stripper-holder plate.

The tool-holder plate shown in FIG. 2 is similar to plate of the movable upper tool for separating blanks as described in patent CH-682651. The board is of wood, comprising a rectangular frame 41 measuring 1.6×1.1×) 0.02 m and having sides connected by a plurality of cross-pieces 42 to form a perforated flat plate. The surfaces of the cross-pieces adapted to face the cardboard sheet and the central stripping board are covered, e.g. by sticking, with a layer of velcro-type hook fibers. The openings 44 between perpendicular cross-pieces are square or rectangular holes with sides measuring about 30 to 40 millimeters. The front edge of the frame 41 has a projecting centering stop 43.

Figure 3:
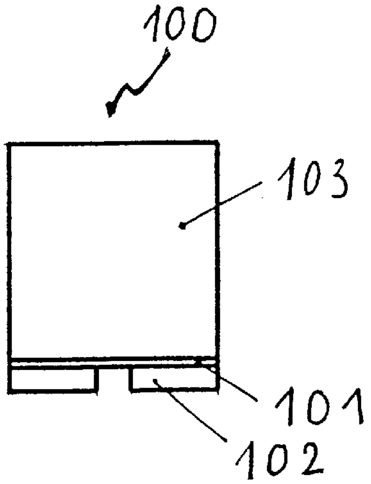
FIG. 3 is a diagrammatic view of a stripper, in section perpendicular to the plane of the plate in FIG. 2.

The strippers are studs of varying shapes, inter alia cylindrical, prismatic or rectangular. The stud 100, shown in section in FIG. 3, has a base 101 comprising a metal baseplate covered, by sticking on to the surface thereof adapted to come into contact with the stripper-holder plate, with a layer 102 of "velcro"-type hook fibers for fixing the stud to the stripper-holder plate. In FIG. 3 the layer of fibers 102 is discontinuous and made up of two strips, to facilitate hooking. The other surface of the metal plate is lined with a block of resilient foam 103, e.g. of PVC or PU, chosen so as to be capable of detaching the waste pieces of sheet with slight squeezing and then returning many times to its initial shape. The surface of the plate forming the base 101 is chosen so that it can be fixed on the stripper-holder plate without overhang, in spite of the openings between the cross-pieces. If the openings in the stripper-holder plate are squares measuring about 40×40 millimeters the stripper can for example have a rectangular base surface area of 75×30 millimeters or a circular area 50 millimeters in diameter. The stripper may alternatively comprise a block of wood.

The stripper-holder plate 40 is placed on the support bar 2 with its centering stop 43 engaged in the notch in the centering stud 6 and the velcro-covered surface towards the front of the presetting table. The latch 12 secures the edge of the plate 40. The prefabricated central stripping board 5 is placed on the support bar 3 and its centering stop 8 engages in the notch in the centering stud 7. The pivoting arm 13 is lowered, pulling on the end of the presser finger 15, then released so that the central stripping board 5 presses against the "velcro" surface of the stripper-holder plate 40, releasing those surfaces of the stripper-holder plate which correspond to the cut waste. The stripper studs 100 are pressed by the operator "velcro against velcro", following the edges of the apertures in the central stripping board 5 and leaving a space of the order of 3–4 mm.

After the central stripping board has been withdrawn from the table, the stripper-holder plate can, outside the zones corresponding to the apertures in the stripping board, still receive bearing blocks having a structure similar to that of the stripper 100 apart from the fact that the foam used is a soft foam which crushes when the upper stripping die comes in contact with the cardboard sheet and returns to its shape when the stripping die rises. These bearing blocks help to hold the cardboard sheet on the central stripping board during the stripping phase.

The upper stripping die thus prepared can handle most jobs for cutting sheets into blanks for making cardboard packagings which do not have waste of small dimensions.

EXAMPLE 2 Preparation of an Upper Stripping Tool in the Case of Small-size Waste The stripper-holder plate comprises a pair of perforated metal sheets mounted on a frame as described in patent application CH 1417/99. The plate is positioned on the support bar 2 of the presetting table, and the centering stop of the stripper-holder plate in the machine engages in the notch in the centering stud 6.

The movable carriage 11 is lowered so that the latch 12 comes into contact with the upper edge of the stripper-holder plate. The central stripping board 5 is positioned in the same manner as in example 1. The strippers, in the form of studs with a magnetic base, are positioned in the same manner as in example 1. In order to position the pins in a U shape, the operator moves to the other side of the presetting table, where he can clearly make out the apertures in the central stripping board through the large number of holes in the perforated plates.

After the strippers have been positioned, the central stripping board is withdrawn from the table. The upper stripping die can still receive soft foam supporting blocks provided with a magnetic base.

EXAMPLE 3

Preparation of a Gripper Stripping Tool

The upper stripping die is prepared as in example 2. The operator has the stripping board in front of him, together with the assembly of pins and stripper studs, which extend through the apertures in the board. He can judge which waste pieces are at risk of not coming completely loose, with a risk of jamming. He vertically positions telescopic pin holder bars on the appropriate indexed fixing means 22 on the frame 16 on a crossbar, itself fixed to the fixing means 21, and fixes the telescopic pins approximately thereto. The frame 16 is brought into the adjustment position, and the position of the telescopic pins in a plane parallel to the central stripping board is adjusted so that the free point of the telescopic pin comes exactly in line with an upper stripping pin or with a chosen zone of a stripper stud. The height of the telescopic gripper pin, along an axis perpendicular to the said plane, is then adjusted so that at rest it presses slightly or penetrates about 1 to 2 millimeters into the stripper head. Once the assembly of telescopic gripper pins has been positioned and adjusted, the frame 16 is moved back and the adjustable bars are positioned in the pull-out frame of the stripping station, keeping to the indexing of the fixing means. The central stripping board is then withdrawn and positioned in the profiled clamping stripping station 23. The upper stripping die can if required receive support blocks and finally the said upper stripping die is positioned in the stripping station and fixed by the clamping profiles 23.

What is claimed is:

1. A method of preparing a system of converting tools for use in a stripping station in a converting press, wherein the system of converting tools comprises at least one central stripping board having a plurality of apertures passing through the board, and an upper stripping die having a stripper holder plate, the method comprising:

disposing the central stripping board and the stripper holder plate face to face outside the converting press in a fixed adjustment position;

fixing strippers to the stripper holder plate for forming the upper stripping die, by fixing respective strippers in line with the apertures in the central stripping board; and then placing and centering the upper stripping die and the central stripping board in the stripping station, wherein the stripper holder plate and the central stripping board are in the same relative positions, as seen in projection onto a plane parallel to the central stripping board, when they are in the adjustment position as the positions occupied when they are in the stripping station during lateral centering thereof relative to the machine axis and during longitudinal adjustment to a first rule.

2. The method of claim 1, wherein the central stripping board and the stripper holder plate are in near contact when they are in the adjustment position.

3. The method of claim 2, wherein in the adjustment position, the front edge of the central stripping board is positioned against a support surface and the front edge of the stripper holder plate is positioned against a support surface; and wherein the centering of the upper stripping die and the central stripping board in the adjustment position is obtained by mating of the centering means of the upper stripping die and of the central stripping board with corresponding centering means secured to the respective support surfaces.

4. The method of claim 3, wherein the central stripping board includes a plurality of apertures through which air may flow;

the stripper holder plate has a facing surface facing the central stripping board, the facing surface of the stripper holder plate being at least partially covered with a first layer of hook fibers;

a plurality of the strippers being provided each having a base at least partially covered with a second layer of mating hook fibers;

the method further comprising attaching the strippers to the stripper holder plate through the apertures in the central stripping board, and using the edges of the apertures as reference points for installation of the strippers to the stripper holder plate.

5. The method of claim 1, further comprising fixing of a lower gripper tool holder into an adjustment position in line with the fixed central stripping board, the adjustment position being the same relative position as that occupied in the stripping station.

* * * * *